United States Patent
Jang et al.

(10) Patent No.: US 9,698,692 B2
(45) Date of Patent: Jul. 4, 2017

(54) MULTI-PHASE INTERLEAVED CONVERTER AND CONTROL METHOD THEREOF

(71) Applicant: Hyundai Motor Company, Seoul (KR)

(72) Inventors: Hui Sung Jang, Gyeonggi-do (KR); Shin Hye Chun, Jeollanam-do (KR); Mu Shin Kwak, Gyeonggi-do (KR); Hyun Wook Seong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 14/562,696

(22) Filed: Dec. 6, 2014

(65) Prior Publication Data

US 2015/0333629 A1    Nov. 19, 2015

(30) Foreign Application Priority Data

May 15, 2014 (KR) ......................... 10-2014-0058241

(51) Int. Cl.
*H02M 3/158* (2006.01)
*H02M 1/14* (2006.01)

(52) U.S. Cl.
CPC .......... *H02M 3/1584* (2013.01); *H02M 1/14* (2013.01); *H02M 2003/1586* (2013.01)

(58) Field of Classification Search
CPC ....... H02M 3/1584; H02M 2003/1586; H02M 3/1588; H02M 3/157; H02M 3/156; H02M 2001/0009; H02M 2001/0012; Y02B 70/1466; H02J 1/102
See application file for complete search history.

(56) References Cited

U.S. PATENT DOCUMENTS

| 6,215,290 B1 * | 4/2001 | Yang ................... H02M 3/1584 323/282 |
| 2010/0013304 A1 * | 1/2010 | Heineman ................. G06F 1/26 307/31 |

(Continued)

FOREIGN PATENT DOCUMENTS

| JP | 10-257773 A | 9/1998 |
| JP | 2008-306805 A | 12/2008 |

(Continued)

*Primary Examiner* — Adolf Berhane
*Assistant Examiner* — Henry Lee, III
(74) *Attorney, Agent, or Firm* — Mintz Levin Cohn Ferris Glovsky and Popeo, P.C.; Peter F. Corless (57) ABSTRACT

A multi-phase interleaved converter includes n sub-circuits of phases, a current controller and a balancing controller. The n sub-circuits of phases have inputs connected in parallel and outputs connected in parallel in order to convert a direct current (DC) or alternating current (AC) input voltage of one level into a DC or AC output voltage of another level. The current controller receives a current control command and a phase current value of a particular sub-circuit of a particular phase among the n sub-circuits of the respective phases to output a control signal for controlling the particular sub-circuit of the particular phase. The balancing controller receives phase current values of the n sub-circuits of the respective phases and receives a control signal output from the current controller to adjust the duty ratios of control signals applied to the other sub-circuits.

22 Claims, 11 Drawing Sheets

(56) References Cited

U.S. PATENT DOCUMENTS

| | | | |
|---|---|---|---|
| 2011/0089913 A1* | 4/2011 | Li | H02M 1/4208 323/208 |
| 2011/0133704 A1* | 6/2011 | Zambetti | H02M 3/1584 323/212 |
| 2011/0267019 A1* | 11/2011 | Krishnamurthy | H02M 3/1584 323/283 |
| 2013/0194848 A1 | 8/2013 | Bernardinis et al. | |
| 2013/0214751 A1* | 8/2013 | Shiraishi | G05F 1/46 323/272 |
| 2013/0320951 A1 | 12/2013 | Wu et al. | |

FOREIGN PATENT DOCUMENTS

| | | |
|---|---|---|
| JP | 2009-165269 A | 7/2009 |
| KR | 10-0276545 B1 | 12/2000 |
| KR | 10-2001-0050292 A | 6/2001 |
| KR | 10-2008-0049339 A | 6/2008 |
| KR | 10-2010-0077526 A | 7/2010 |

* cited by examiner

FIG. 1

RELATED ART

FIG. 2

RELATED ART

MULTI-PHASE INTERLEAVED CONVERTER AND CONTROL METHOD THEREOF

CROSS-REFERENCE TO RELATED APPLICATION

This application claims under 35 U.S.C. §119(a) the benefit of Korean Patent Application No. 10-2014-0058241 filed on May 15, 2014, the entire contents of which are incorporated herein by reference.

BACKGROUND

Technical Field

The present disclosure relates to a converter, and more particularly, to a multi-phase interleaved converter and a control method thereof.

Background Art

An interleaved converter is a converter that is capable of reducing the amplitude of a whole current ripple due to a cancellation effect between currents, caused by the multi-division of current flow and the generation of phase differences. The interleaved converter is advantageously capable of reducing the capacity and volume of an input/output filter.

Figure 1:
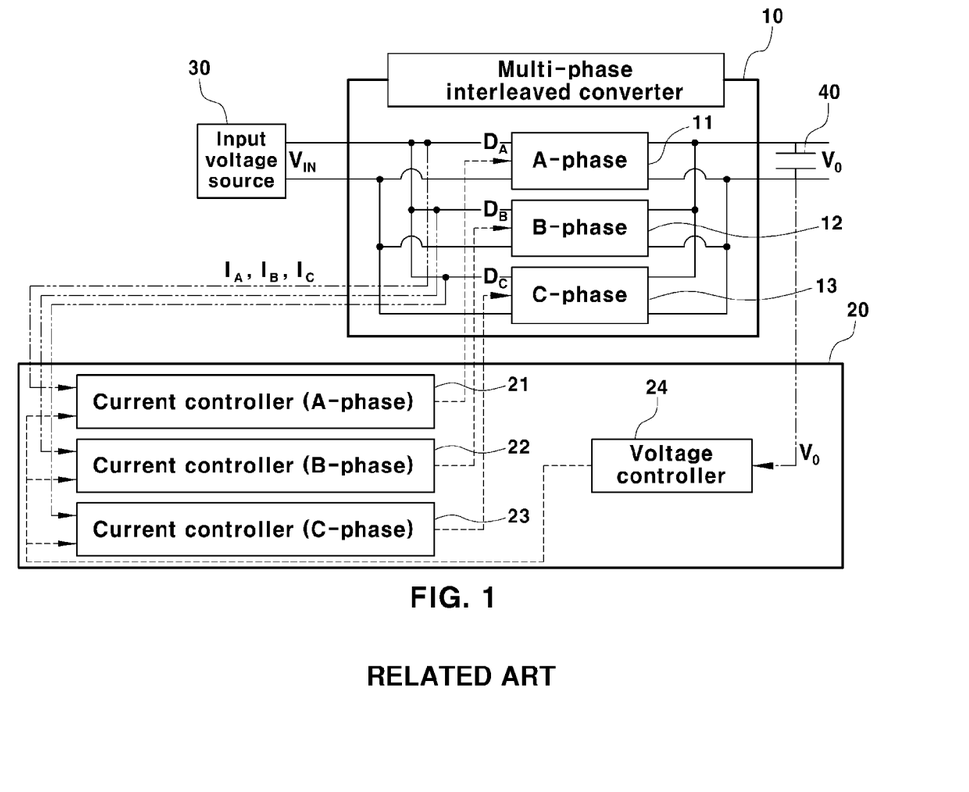
FIGS. 1 and 2 are views showing current control methods of related art interleaved converters.
Figure 2:
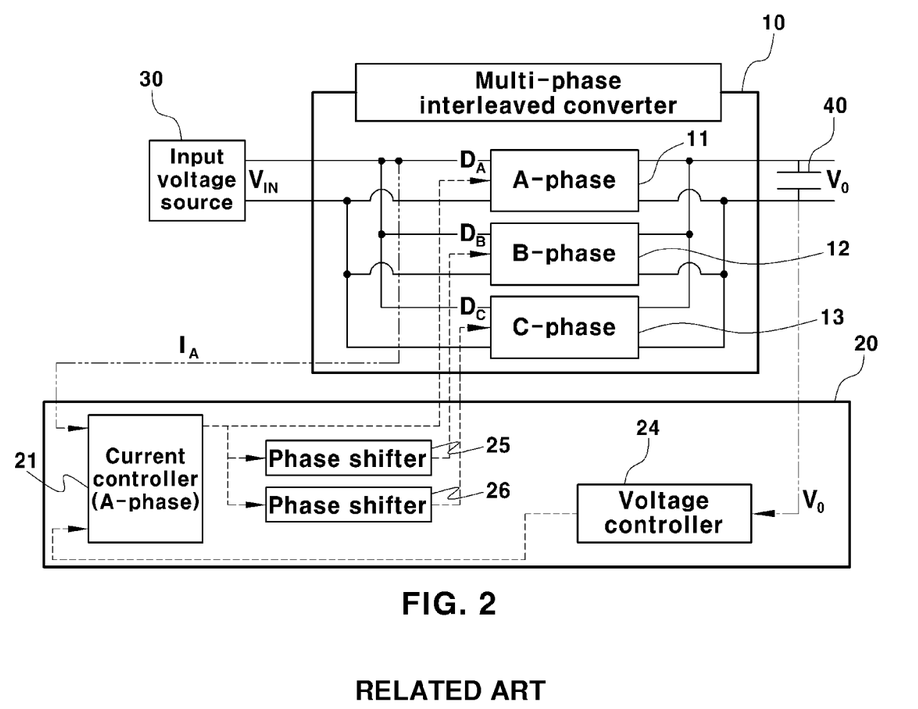

FIGS. 1 and 2 are views showing current control methods of related art interleaved converters. $V_O$ represents an output voltage, $I_A$, $I_B$ and $I_C$ respectively represent phase currents, and $D_A$, $D_B$ and $D_C$ respectively represent phase duty ratios ($I_X$: X-phase current, and $D_X$: X-phase duty ratio). Generally, the current control technique of a multi-phase interleaved converter uses two methods as shown in FIGS. 1 and 2.

The first method is most frequently used, and, as shown in FIG. 1, is a method in which one voltage controller 24 is utilized, and as many current controllers 21, 22 and 23 are utilized as the number of the phases. That is, in this method, current controllers 21, 22 and 23 for the respective phases are utilized. Thus, the current controllers 21, 22 and 23 receive sensed currents $I_A$, $I_B$ and $I_C$ of the phases to generate duty ratio signals $D_A$, $D_B$ and $D_C$ for controlling converters for the phases, respectively. Further, the current controllers 21, 22 and 23 are individually applied, thereby achieving current balance. However, there exists a problem in that the load factor of a microcomputer (MICOM) increases.

The second method is a method in which one voltage controller 24 and one current controller 21 are utilized as shown in FIG. 2. In this method, the current controller 21 receives sensed current $I_A$ of a first phase to generate a duty ratio $D_A$ by performing current control on the first phase, and the other phases are controlled by phase-shifting signals $D_B$ and $D_C$ having the same duty ratio to a predetermined size (different depending on the number of phases). The current controller 21 of the first phase is used, and hence changes in currents of the other phases are not instantaneously and exactly reflected. As a result, current imbalance may be created.

More specifically, the interleaved converter of FIG. 1 converts an output $V_{IN}$ output from an input voltage source 30, using a multi-phase interleaved converter 10, and transmits the converted output to an output terminal. In this state, an interleaved controller 20 controlling converters 11, 12 and 13 taking charge of the respective phases is provided with the current controllers 21, 22 and 23 for the converters 11, 12 and 13 taking charge of the respective phases. That is, a current controller 21 taking charge of phase A is provided to a sub-circuit 11 taking charge of the phase A, a current controller 22 taking charge of phase B is provided to a sub-circuit 12 taking charge of the phase B and, a current controller 23 taking charge of phase C is provided to a sub-circuit 13 taking charge of the phase C.

In the interleaved converter configured as described above, the voltage controller 24 measures a voltage $V_O$ of an output terminal capacitor 40, and transmits the measured voltage to each of the current controllers 21, 22 and 23. The current controllers 21, 22 and 23 for the respective phases generate duty ratio signals $D_A$, $D_B$ and $D_C$ controlling the respective phases, and transmit the generated duty ratios to the interleaved converter 10, thereby controlling current output from the converter. Thus, the current controllers 21, 22 and 23 taking charge of the respective phases facilitate a the balancing of the inductor. However, there exists a problem in that the load factor of the MICOM increases.

FIG. 2 is a view showing a case where only one current controller is provided in the current control method. The interleaved converter of FIG. 2 also transmits an output $V_{IN}$ from the input voltage source 30 to an output terminal, using the multi-phase interleaved converter 10. In this state, the interleaved controller 20 controlling the converters 11, 12 and 13 taking charge of the respective phases is provided with only one current controller 21.

The interleaved converters 12 and 13 of the other phases are controlled by phase-shifting an output signal from the one current controller 21. That is, when the current controller 21 takes charge of the phase A, the converters 12 and 13 respectively taking charge of the phases B and C can phase-shift the signal output from the current controller 21 taking charge of the phase A by 120 degrees and 240 degrees, using phase shifters 25 and 26, and the phase-shifted signals are used for controls of the phases B and C, respectively.

In other words, a duty ratio $D_A$ for controlling current of one phase using the one current controller 21, and the other two phases are controlled by respectively phase-shifting signals $D_B$ and $D_C$ having the same duty ratio by 120 degrees and 240 degrees through phase shifters 25 and 26, respectively. In this method, the load factor of the MICOM can be reduced, but changes in currents of the other phases are not instantaneously and exactly reflected. Therefore, current imbalance may be created

SUMMARY OF THE DISCLOSURE

The present disclosure provides a multi-phase interleaved converter which can effectively protect a power element by solving a problem of current imbalance between phases. The present disclosure also provides a multi-phase interleaved converter which can achieve an effect capable of solving current imbalance between phases, and reduce the load factor of a microprocessor (MICOM) by simplifying an operating process through the use of one current controller and one balancing controller.

In one aspect, the present disclosure provides a multi-phase interleaved converter, including: n sub-circuits of phases, configured to have inputs connected in parallel and outputs connected in parallel in order to convert a direct current (DC) or alternating current (AC) input voltage of one level into a DC or AC output voltage of another level; a current controller configured to: i) receive a current control command and a phase current value of a particular sub-circuit of a particular phase among the n sub-circuits of the respective phases and ii) output a control signal for controlling the particular sub-circuit of the particular phase; and a balancing controller configured to: i) receive phase current values of the n sub-circuits of the respective phases and a control signal output from the current controller and ii)

adjust duty ratios of control signals applied to the other sub-circuits, based on the received phase current values of the sub-circuits of the respective phases and the received control signal of the current controller.

In another aspect, the present disclosure provides a method for controlling a multi-phase interleaved converter, the method including: sensing phase current values of n sub-circuits of the multi-phase interleaved converter; receiving, by a current controller, a current control command and a phase current value of a particular sub-circuit of a particular phase among the n sub-circuits of the respective phases; outputting, by the current controller, a control signal for controlling the particular sub-circuit of the particular phase; receiving, by a balancing controller, phase current values of the n sub-circuits of the respective phases and the control signal output from the current controller; and adjusting, by the balancing controller, duty ratios of control signals applied to the other sub-circuits based on the received phase current values of the sub-circuits of the respective phases and the received control signal of the current controller.

As described above, the multi-phase interleaved converter according to the present disclosure has advantages as follows.

First, it is possible to reduce the load factor of a MICOM. Thus, the number of MICOMs can be decreased as compared with the existing high-priced MICOMs, or the existing high-priced MICOMs can be replaced by low-priced MICOMs having low specifications, thereby saving costs. Further, the load facture of the MICOM can be reduced as compared with the related art current control of each phase, thereby smoothly performing various controls.

Second, it is possible to solve, through a simple improvement of a control technique, a problem of current imbalance between phases, which may occur in the multi-phase interleaved converter, a problem of an increase in load factor of the MICOM due to the use of a large number of current controllers, and the like. Thus, it is possible to prevent current from excessively flowing in a power element of the converter taking charge of any one phase and to solve problems such as overload and damage of the power element and a control impossible state of the MICOM. Further, it is possible to improve the performance and reliability of the interleaved converter and to guarantee the reliability and productivity of the power element in terms of the control technique.

Third, the inductor current that is output from the sub-circuits of the respective phases can be maintained in a balance state, thereby reducing ripples in the inductor current. Here, the current referred to as inductor current is current transmitted as an output to the output terminal by the current controllers 21, 22 and 23 taking charge of the respective phases. Further, an instantaneous change in voltage/current of each phase can be reflected, thereby achieving a fast response.

The above and other features of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods may be executed by at least one controller. The term "controller" refers to a hardware device that can include, for example, a memory and a processor. The memory is configured to store program instructions, and the processor is configured to execute the program instructions to perform one or more processes which are described further below.

Figure 3:
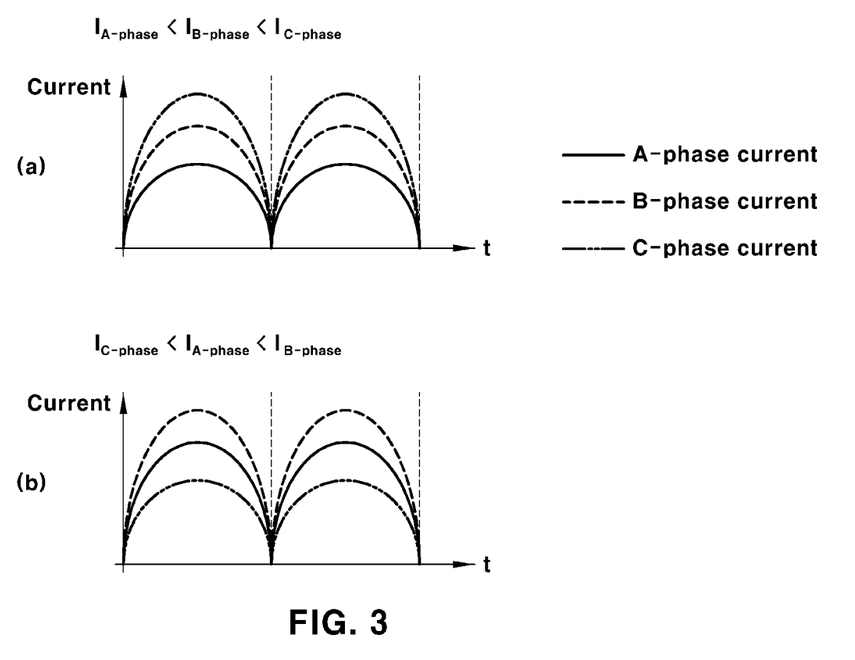
FIG. 3 is a view showing a result obtained by comparing amplitudes of currents respectively output from sub-modules of a multi-phase interleaved converter according to embodiments of the present disclosure.

FIG. 3 is a view showing a result obtained by comparing amplitudes of currents respectively output from sub-modules of a multi-phase interleaved converter according to an embodiment of the present disclosure.

In the multi-phase interleaved converter according to the embodiment of the present disclosure, a sub-circuit may be referred to each branch of a converter (in the case of three phases of phases A, B and C, the multi-phases may be n phases) taking charge of phase A (first phase), phase B (second phase) or phase C (third phase).

In the multi-phase interleaved converter according to the embodiment of the present disclosure, inputs of n sub-circuits are connected in parallel and outputs of the n sub-circuits are connected in parallel in order to convert a direct current (DC) or alternating current (AC) input voltage of one level into a DC or AC output voltage of another level.

Each branch may be implemented in the form of a half bridge or full bridge, using semiconductor switching elements.

However, in the multi-phase (A, B, C, . . . , n phases) interleaved converter according to the embodiment of the present disclosure, the driving of a circuit topology is emphasized rather than the circuit topology, and thus, various types of circuits available in the art can be used.

In the case of three phases (n=3) of phases A, B and C, it can be seen in FIG. 3(a) that inductor current output from the sub-circuit taking charge of the phase B is greater than that output from the sub-circuit taking charge of the phase A, and inductor current output from the sub-circuit taking charge of the phase C is greater than that output from the sub-circuit taking charge of the phase B ($I_A<I_B<I_C$).

Actually, in FIG. 3, the inductor current output from the sub-circuit taking charge of the phase B should be output later by 120 degrees in phase than that output from the sub-circuit taking charge of the phase A (in the case of the phase C, the inductor current output from the sub-circuit taking charge of the phase C should be output later by 120 degrees in phase than that output from the sub-circuit taking charge of the phase B). However, it has been illustrated in FIG. 3 that the sub-circuits have the same phase in order to efficiently compare the amplitudes of inductor currents output from the respective sub-circuits.

If a large amount of inductor current is output from the sub-circuit taking charge of the phase B or C as described above, a power element such as an insulated gate bipolar transistor (IGBT) employed as a semiconductor switching element in the sub-circuit of the phase B or C should take charge of a larger amount of conduction current, and therefore, an overload is applied to the power element. In addition, a deviation between the inductor currents output from the sub-circuits taking charge of the phases A, B and C is large, and therefore, the ripple of the entire output current becomes large.

In order to solve such a problem, the duty of a control signal for controlling the sub-circuit of the phase A is increased, while the duty of a control signal for controlling the sub-circuit of the phase B or C is decreased. When $I_C<I_A<I_B$ as shown in FIG. 3 (b), the duty of the phase C is increased, and the duty of the phase A or B is decreased. In the present disclosure, the duties of the respective phases are differently applied using a current error between the phases through a balancing controller.

Figure 4:
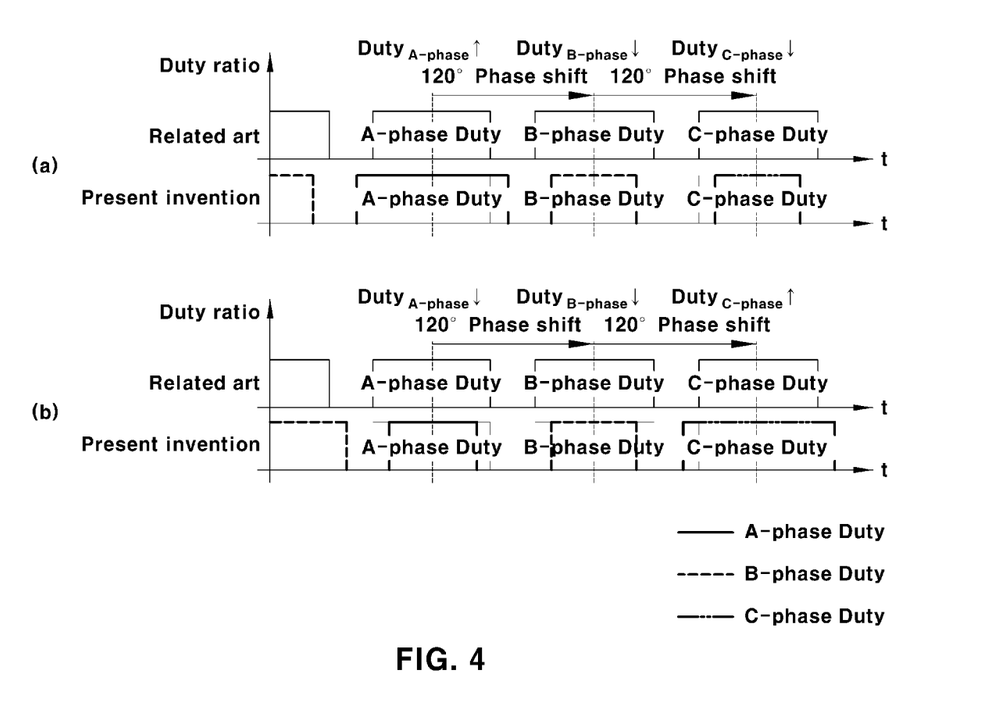
FIG. 4 is a view showing a state in which the duty ratios of control signals respectively applied to sub-circuits of the multi-phase interleaved converter are controlled according to embodiments of the present disclosure.

FIG. 4 is a view showing a state in which the duty ratios of control signals respectively applied to the sub-circuits of the multi-phase interleaved converter are controlled according to the embodiment of the present disclosure.

In the related art, it can be seen that the duties of control signals respectively applied to the sub-circuits taking charge of the phases A, B and C are the same. The phase difference between the control signals of the respective sub-circuits taking charge of the phases A, B and C is only 120 degrees (in the case of the three phases, 360/n (n=3)).

However, in order to improve the current imbalance state in which a larger amount of inductor current is applied to the sub-circuit taking charge of the phase B or C than that of inductor current applied to the sub-circuit taking charge of the phase A, as shown in FIG. 3 (a), the duty of the control signal applied to the sub-circuit taking charge of the phase A is increased, and the duty of the control signal applied to the sub-circuit taking charge of the phase B or C is decreased, as shown in FIG. 4 (a). That is, the semiconductor switching element of the sub-circuit taking charge of the phase A performs an "On" process for a time longer than the current driving time, and the semiconductor switching element of the sub-circuit taking charge of the phase B or C performs the "On" process for a time shorter than the current driving time.

In order to improve the current imbalance state in which a larger amount of inductor current is applied to the sub-circuit taking charge of the phase A or B than that of inductor current applied to the sub-circuit taking charge of the phase C, as shown in FIG. 3 (b), the duty of the control signal applied to the sub-circuit taking charge of the phase C is increased, and the duty of the control signal applied to the sub-circuit taking charge of the phase A or B is decreased, as shown in FIG. 4 (b). That is, the semiconductor switching element of the sub-circuit taking charge of the phase C performs the "On" process for a time longer than the current driving time, while the semiconductor switching element of the sub-circuit taking charge of the phase A or B performs the "On" process for a time shorter than the current driving time.

In the present disclosure, as shown in FIGS. 4 (a) and (b), the duties of the respective phases are differently applied using a current error between the phases through a balancing controller. As a result, the current imbalance state between the respective phases can be improved as shown in FIG. 5.

Figure 5:
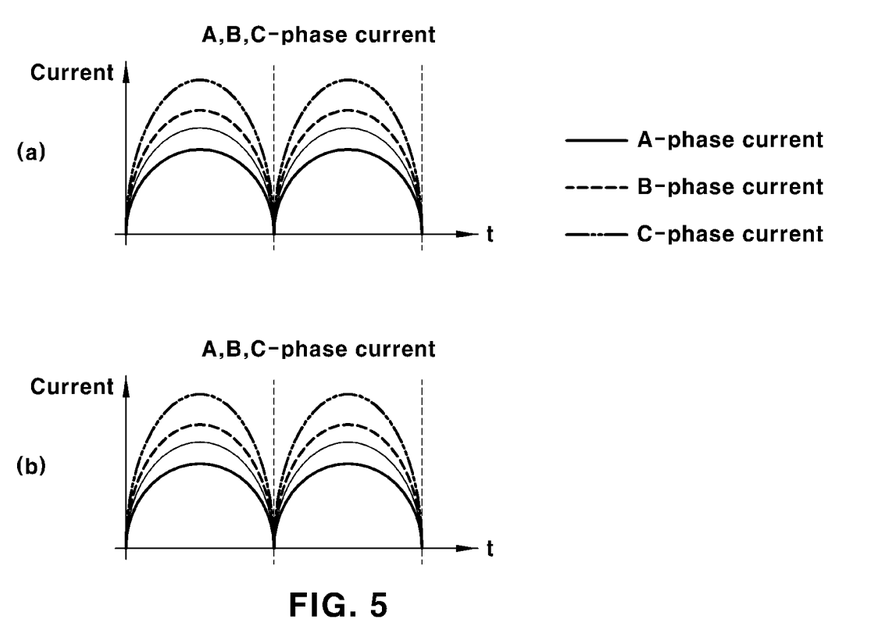
FIG. 5 is a view showing a state in which current balance is controlled when duty ratios of phases are differently applied using current errors between the respective phases through a balancing controller in the present disclosure.

In FIG. 5, the phases have the same phase in order to compare the amplitudes of currents output from the respective sub-circuits of the phases. However, in the case of the three phases, the current output from the sub-circuit taking charge of the phase B may have a value later by 120 degrees (360/n×1 (n=3)) in phase than that of the current output from the sub-circuit taking charge of the phase A, and the current output from the sub-circuit taking charge of the phase C may have a value later by 240 degrees (360/n×2 (n=3)) in phase than that of the current output from the sub-circuit taking charge of the phase A.

Figure 6:
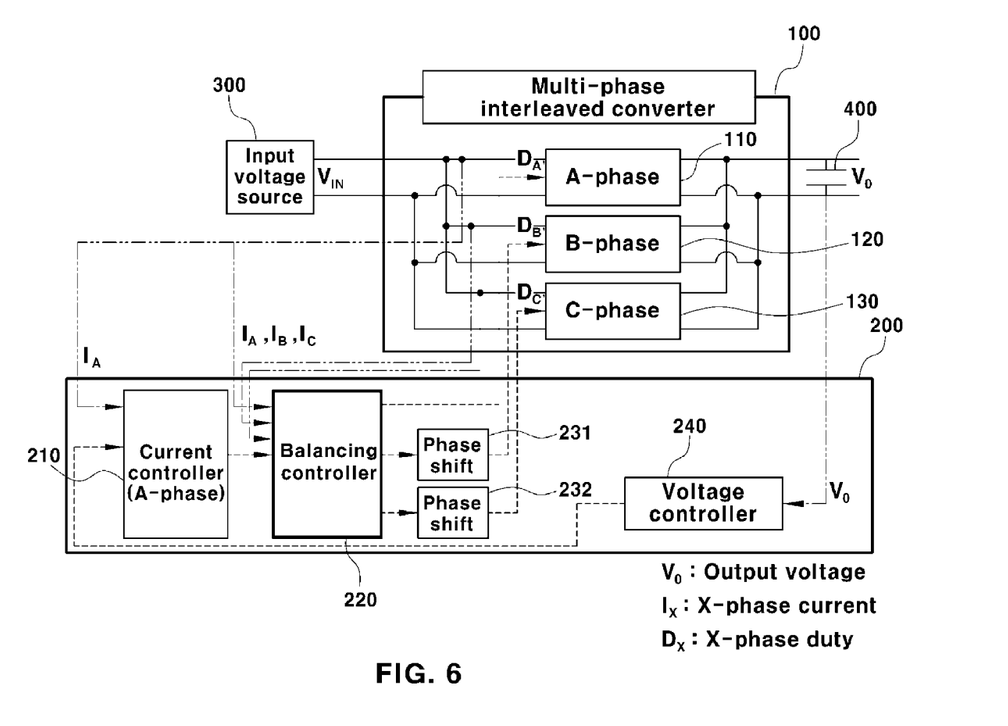
FIG. 6 is a configuration view of the multi-phase interleaved converter according to embodiments of the present disclosure.

FIG. 6 is a view illustrating in detail the multi-phase interleaved converter for implementing the concept of the present disclosure, which illustrates an example in which the multi-phase interleaved converter is applied to the three phases A, B and C.

The three-phase interleaved converter 100 according to the embodiment of the present disclosure may include a circuit topology implemented in a three-phase interleaved type, an interleaved controller 200, an input voltage source 300 ($V_{IN}$) and an output terminal capacitor 400. The circuit topology of the three-phase interleaved converter 100 according to the embodiment of the present disclosure may include a sub-circuit 110 taking charge of the phase A, a sub-circuit 120 taking charge of the phase B, and a sub-circuit 130 taking charge of the phase C.

The interleaved controller 200 applying a control signal to each of the sub-circuits 110, 120 and 130 may include a current controller 210, a balancing controller 220 positioned at the rear end of the current controller 210, phase shifters 231 and 232, and a voltage controller 240. The voltage controller 240 may receive output voltages of n sub-circuits, i.e., an output voltage $V_O$ of the output terminal capacitor 400 to transmit an output signal (e.g., current control command) that is in proportion to the amplitude of the received output voltage $V_O$. The current controller 210 may receive the output signal (e.g., current control command) output from the voltage controller 240 and inductor current $I_A$ output from the sub-circuit 110 of one phase among the sub-circuits of the respective phases to generate and output a control signal $D_A$ for the one phase. For example, the current controller 210 may receive $I_A$ that is current output from the sub-circuit 110 taking charge of the phase A and signal output from the voltage controller 240, and output, from the received current and signal, a duty ratio signal DA for controlling the sub-circuit 110 taking charge of the phase A.

The balancing controller 220 has, as input information, current sensing information $I_A$, $I_B$ and $I_C$ of the respective phases and the duty ratio (e.g., $D_A$ in FIG. 6) of an arbitrary one phase (e.g., the phase A in FIG. 6, and the phase 1 in FIG. 6), which is an output of the current controller 210. In addition, a balance current command is set in the balancing controller 220, and sensed current of an arbitrary one phase is set as the balance current command. In this state, current (e.g., $I_A$ that is current of the phase A in FIG. 6, and sensing current of the phase 1 in FIG. 7) used in the current controller 210 may be set as the balance current command. Accordingly, the balancing controller 220 may obtain and output duty ratios $D_B$ and $D_C$ for the other phases from the sensed currents $I_A$, $I_B$ and $I_C$ of the respective phases, the duty ratio $D_A$ for the arbitrary one phase, and the balance current command $I_A$.

Figure 7:
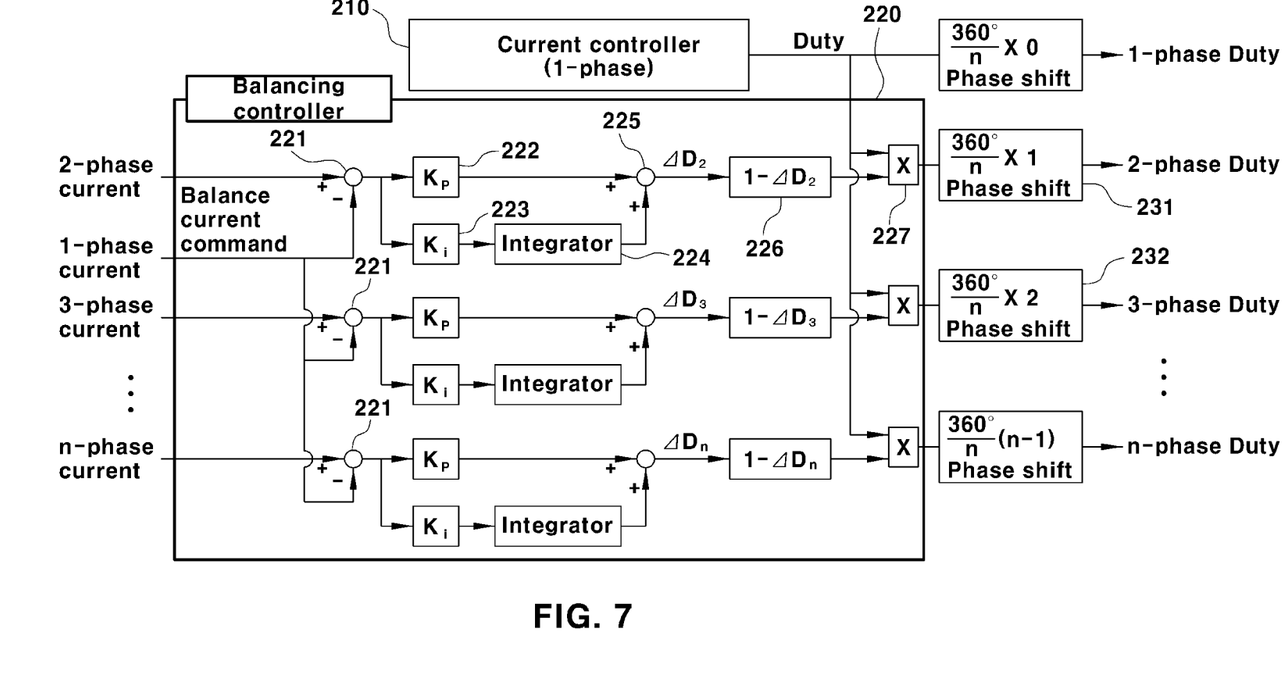
FIG. 7 is a view showing an internal control block of the balancing controller in the multi-phases (n-phase) interleaved converter according to embodiments of the present disclosure.

This will be described with reference to FIG. 7. FIG. 7 is a view showing an internal control block of the balancing controller 220 in the multi-phases (n-phase) interleaved converter according to the embodiment of the present disclosure.

In FIG. 7, the phases in the multi-phase (n-phase) interleaved converter have been represented as phases 1, 2, 3, ..., n. However, the case where the phases 1, 2 and 3 are respectively represented as the phases A, B and C has been illustrated in FIG. 6.

The balancing controller 220 illustrated in FIG. 7 is set to use, as a balance current command, current of an arbitrary one phase among currents of the respective phases, i.e., current of the phase 1 (e.g., current of the phase A in FIG. 6), while receiving currents (currents of the n phases, and $I_A$, $I_B$ and $I_C$ in FIG. 6) of the respective phases (the phases A, B and C in FIG. 6), which are sensed and output from sub-circuits (110, 120 130 in FIG. 6) taking charge of the respective phases (the phases 1, 2, 3, ..., n). The balancing controller 220 calculates, from input sensing information, errors between the balance current command and 2-phase current (B-phase current in FIG. 6), 3-phase current (C-phase current in FIG. 6), ..., n-phase current.

The balancing controller 220 determines the duty ratios (2-phase duty ratio, 3-phase duty ratio, ..., n-phase duty ratio, and for example, $D_B$ and $D_C$ in FIG. 6) of control signals required to drive the sub-circuits (sub-circuits of the phases B and C, respectively designated by reference numerals 120 and 130 in FIG. 6) taking charge of the respective other phases (phases 2, 3, ..., n, and for example, the phases B and C in FIG. 6) except the phase 1 (e.g., the phase A in FIG. 6) by reflecting these errors.

In this state, the control signals adjusted at the duty ratio of the respective other phases except the phase 1 to be output in the balancing controller 220 are phase shifted by 360/n× (n−1) degrees (n=3 in FIG. 6) while passing through the phase shifters 231 and 231 before being applied to the sub-circuits (sub-circuits of the phases B and C, respectively designated by reference numerals 120 and 130 in FIG. 6) taking charge of the respective other phases. Thus, the phase-shifted control signals are applied to the respective sub-circuits (120 and 130 in FIG. 6).

In the present disclosure, the process of adjusting the duty ratios of control signals will be described in detail. First, the multi-phase (n-phase) interleaved converter according to the embodiment of the present disclosure may go through a process of sensing currents (1-phase current, 2-phase current, 3-phase current, ..., n-phase current) output from the sub-circuits taking charge of the respective phases (phases 1, 2, 3, ..., n).

Then, the multi-phase (n-phase) interleaved converter calculates errors between the balance current command (1-phase current) and currents of the respective phases, and differently applies the duty ratios of control signals applied to the respective phases by reflecting the calculated errors. The multi-phase (n-phase) interleaved converter outputs the control signals of which duty ratios are adjusted as described above and applies the output control signals to the respective sub-circuits.

In this process, the balancing controller 220 may receive currents of the respective phases, and obtain errors by subtracting a balance current command from the currents of the respective phases, using the current of any one phase (1-phase current) among the currents of the respective phases, which is used in generating the duty ratio in the current controller 210, as the balance current command. This process may be performed through adders 221.

Next, each error value may be amplified at a predetermined amplification rate. For example, the error value may be amplified into gain values $K_p$ and $K_i$. That is, this process may be performed through an amplifier 222 having the gain value $K_p$ and an amplifier 223 having the gain value $K_i$. One of signals amplified with a predetermined value may be integrated through an integrator 224. For example, in FIG. 7, the signal amplified with the value of $K_i$ may be amplified while passing through the amplifier 223. The values amplified through the predetermined gain value and a value among the amplified values, which is obtained through the integration process, may pass through an adder 225, thereby obtaining ΔD that is a difference value between duty ratios to be adjusted.

Next, a process of obtaining a duty ratio to be appropriately adjusted from ΔD may be performed. That is, signals of the respective phases may be adjusted to 1−Δ $D_2$, 1−ΔD$_3$, . . . , 1−ΔD$_n$. The block for performing this process may be referred to as a duty adjuster 226. The signals may be multiplied by a signal output from the current controller 210 through a multiplier 227, thereby obtaining the duty ratios of control signals required to drive the sub-circuits taking charge of the respective phases except the phase 1.

Unlike the driving signal for driving the sub-circuit taking charge of the phase 1, the driving signals for driving the sub-circuits taking charge of the phases 2, 3, . . . , n may be respectively applied to semiconductor switching elements of the sub-circuits taking charge of the phases 2, 3, . . . , n by phasing through the phase shifters 231 and 232. That is, the phases 2, 3, . . . , n may be respectively delayed by 360/n×1, 360/n×2, . . . , 360/n×(n−1) degrees with respect to the phase 1, to be input to the semiconductor switching elements of the sub-circuits taking charge of the respective phases.

FIG. 7 illustrates a specific example in which the duty ratios of the respective phases are differently applied. In the present disclosure, when the duty ratios of the other phases except an arbitrary one phase in order to improve the current imbalance problem, error values between a balance current command and currents of the respective other phases except the arbitrary one phase (e.g., the phase 1) are obtained, duty ratio difference values (duty ratio correction values) ΔD$_2$, ΔD$_3$, . . . , ΔD$_n$ are then obtained, and the duty ratios of the respective other phases (the duty ratios of the respective phases 2, 3, . . . , n) are obtained through a predetermined operation (addition, multiplication, subtraction, division, or the like), using the obtained values and the duty ratio of the arbitrary one phase (phase 1), thereby differently applying the duty ratios of the respective phases in the occurrence of current imbalance.

Although not illustrated in this figure, the balancing controller may be configured to obtain difference values between the balance current command and current values from the sub-circuits of the respective other phases, obtain a duty ratio correction values by amplifying each difference value at a predetermined amplification rate K$_p$, and then multiply the duty ratio of the control signal output from the current controller by the value obtained by subtracting the duty ratio correction value from 1, thereby applying the obtained control signal as a control signal to the sub-circuits of the other phases.

Figure 8:
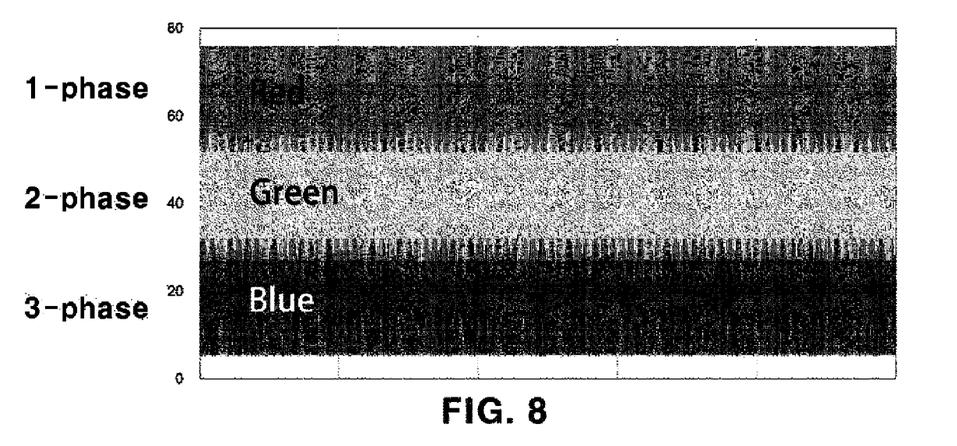
FIG. 8 is a graph showing inductor currents of the respective phases in the related art multi-phase interleaved converter.
Figure 9:
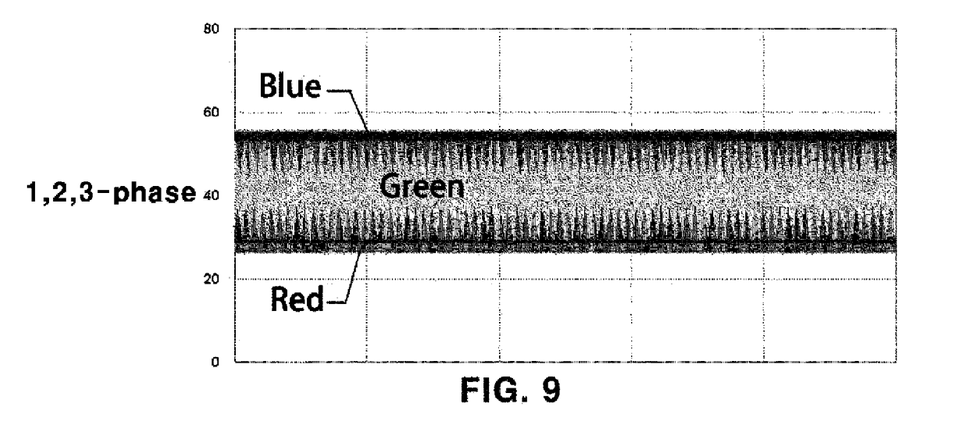
FIG. 9 is a graph showing a result obtained by measuring current of an output terminal of the multi-phase interleaved converter to which the balancing controller is applied according to embodiments of the present disclosure.

FIGS. 8 and 9 are views comparing inductor currents before and after the multi-phase (three-phase) interleaved converter according to the embodiment of the present disclosure is applied.

FIG. 8 is a graph showing inductor currents of the respective phases before the multi-phase (three-phase) interleaved converter according to the embodiment of the present disclosure is applied, i.e., in a state in which the balancing controller 220 is not provided. The red graph represents inductor current of the phase 1 (phase A), the green graph represents inductor current of the phase 2 (phase B), and the blue graph represents inductor current of the phase 3 (phase C).

In the related art, differences between currents of the respective phases in the actual interleaved converter exist as shown in the waveforms of FIG. 8. As the analysis result of the waveforms, it can be seen that the imbalance between the currents of the respective phases may become serious as time elapses.

FIG. 9 is a graph showing a result obtained by measuring current at the output terminal of the multi-phase (three-phase) interleaved converter to which the balancing converter 220 is applied according to the embodiment of the present disclosure. The red graph represents inductor current of the phase 1 (phase A), the green graph represents inductor current of the phase 2 (phase B), and the blue graph represents inductor current of the phase 3 (phase C).

Referring to the graph of FIG. 9, unlike the graph of FIG. 8, the waveforms of the inductor currents of the respective phases almost correspond to one another. Meanwhile, FIG. 7 illustrates an embodiment in which current of an arbitrary one phase is used as the balance current command. However, FIG. 10 illustrates an embodiment in which a separate balance current command generation block 228 for outputting a balance current command operated using one or multi-phase current information as an input is additionally provided in the balancing controller 220.

The balance current command generation block 228 generates, as a balance current command, a value obtained through a predetermined operation from one or multi-phase current information, and the generated balance current command is used identically to that in the embodiment of FIG. 7.

Figure 10:
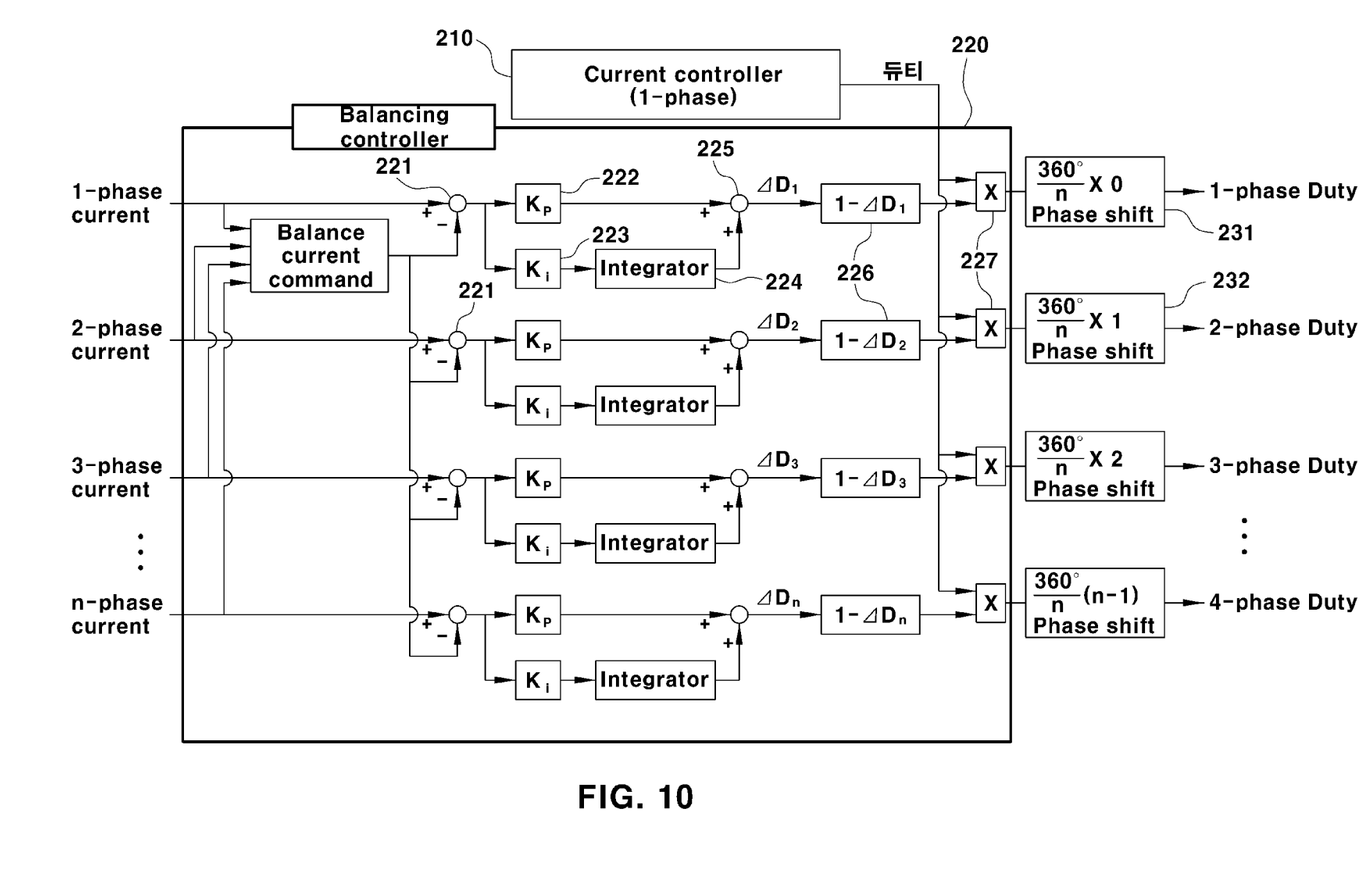
FIG. 10 is a view showing the balancing controller additionally having a balance current command generation block in the present disclosure.

The duty ratios of the respective phases are differently applied through the same process except that the separate balance current command generation block 228 is provided in the embodiment of FIG. 10, and therefore, its detailed description will be omitted to avoid redundancy.

Figure 11:
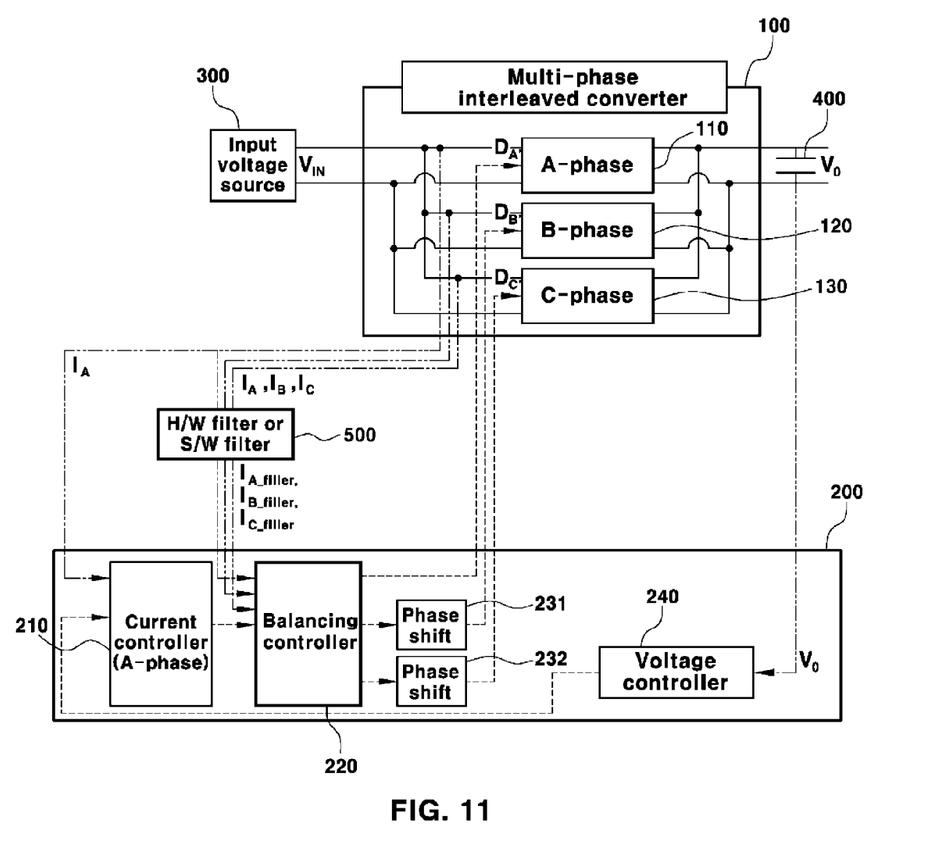
FIG. 11 is a configuration view of a multi-phase interleaved converter according to embodiments of the present disclosure.

FIG. 11 is a configuration view of a multi-phase interleaved converter according to another embodiment of the present disclosure.

In the embodiment of FIG. 11, it is possible to perform current balance control and to reduce the load factor of a microprocessor (MICOM) by decreasing the operation time of a controller. That is, the operation time of the balancing controller 220 can become shorter than that of the current controller 210 while allowing the performance period of the balancing controller 220 to become longer than that of the current controller 210. Accordingly, the load factor of the MICOM can be reduced.

To this end, a filter 500 for averaging sensing currents of each phase is additionally provided in the embodiment of FIG. 11. The embodiment of FIG. 11 is not different from those of FIGS. 6 and 10 in function of components, operation processes, and the like, except that the filter 500 for each phase is additionally provided (in the case of n phases, n filters are provided).

However, in the embodiment of FIG. 11, the balancing controller 220 uses, as input information, currents I$_{A\_filter}$, I$_{B\_filter}$ and I$_{C\_filter}$ averaged through the respective filters 500, rather than the sensed currents I$_A$, I$_B$ and I$_C$ of the respective phases.

The embodiment of FIG. 11 is not different from that of FIG. 5 in the operation process of the balancing controller 220, the phase shifting process of the phase shifters 231 and 232, and the like, except that the process of averaging current of each phase using the filter 500 is added, and therefore, their descriptions will be omitted to avoid redundancy.

Generally, the current imbalance of the multi-phase interleaved converter may be caused by various hardware factors such as a processing tolerance of an inductor and a difference in resistance, and the current balance control does not require a fast response. Thus, in the embodiment of FIG. 11, the current for each phase, averaged using the simple filter 500, is transmitted as input information to the balancing controller 220, thereby performing the current balance control.

According to the balance current control method of the interleave converter using the filter 500, it is possible to reduce the load factor of the MICOM by decreasing the operation time of the balancing controller 220 (applying the performance period capable of reducing the load factor). In addition, it is possible to prevent a problem of current imbalance between phases, which may occur in the interleaved converter, and overload and damage of a power element, caused by the current imbalance.

Figure 12:
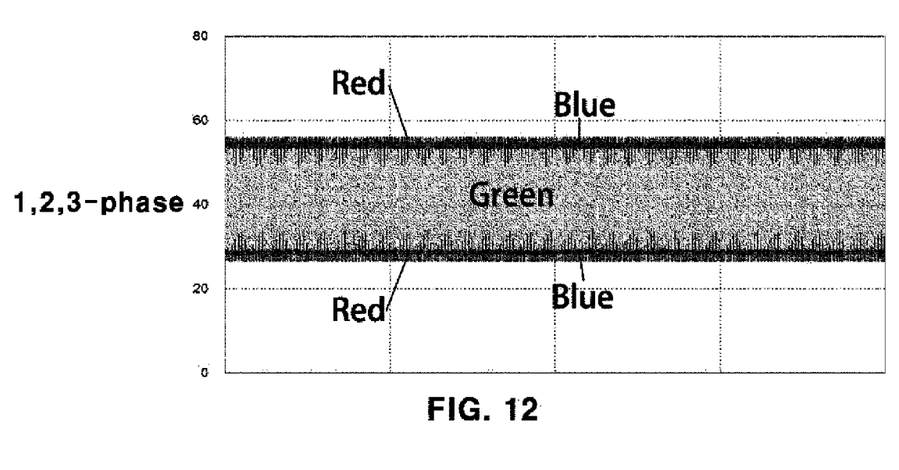
FIG. 12 is a graph showing a result obtained by measuring current of an output terminal of the multi-phase interleaved converter in the embodiments shown in 11.

FIG. 12 is a graph showing a result obtained by measuring current at the output terminal of the multi-phase interleaved converter in the embodiment of FIG. 11. The red graph represents inductor current of the phase 1 (phase A), the green graph represents inductor current of the phase 2 (phase B), and the blue graph represents inductor current of the phase 3 (phase C).

Referring to the graph of FIG. 12, it can be seen that the waveforms of inductor currents of the respective phases almost correspond to one another.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A multi-phase interleaved converter, comprising:
   n sub-circuits of phases configured to have inputs connected in parallel and outputs connected in parallel in order to convert a direct current (DC) or alternating current (AC) input voltage of one level into a DC or AC output voltage of another level;
   a current controller configured to: i) receive a current control command and a phase current value of a particular sub-circuit of a particular phase among the n sub-circuits of respective phases and ii) output a control signal for controlling the particular sub-circuit of the particular phase;
   a balancing controller configured to: i) receive phase current values of the n sub-circuits of the respective phases and the control signal output from the current controller and ii) adjust duty ratios of control signals applied to the other sub-circuits based on the received phase current values of the n sub-circuits of the respective phases and the received control signal of the current controller, and
   a phase shifter configured to shift the phase of a control signal output from the balancing controller,
   wherein the particular sub-circuit directly receives a control signal output through the balancing controller, and the other sub-circuits receive a control signal of which phase is shifted by the phase shifter.

2. The multi-phase interleaved converter of claim 1, further comprising a voltage controller configured to: i) receive output voltages of the n sub-circuits and ii) output the current control command according to an amplitude of the received output voltages.

3. The multi-phase interleaved converter of claim 1, wherein the balancing controller: i) calculates difference values between a balance current command value determined from the phase current value of the particular sub-circuit and phase current values of the other sub-circuits and ii) adjusts the duty ratios of control signals applied to the other sub-circuits based on the difference values and the control signal of the current controller.

4. The multi-phase interleaved converter of claim 1, wherein, when phase current of a sub-circuit of any one phase among the n sub-circuits is greater than that of a sub-circuit of another phase, the balancing controller decreases the duty ratio of a control signal applied to the sub-circuit of the one phase.

5. The multi-phase interleaved converter of claim 1, wherein, when phase current of a sub-circuit of any one phase among the n sub-circuits is smaller than that of a sub-circuit of another phase, the balancing controller increases the duty ratio of a control signal applied to the sub-circuit of the one phase.

6. The multi-phase interleaved converter of claim 1, wherein the phase shifter phase-shifts, by 360/n×(n−1) degrees, the control signal output from the balancing controller in an n-phase interleaved converter.

7. The multi-phase interleaved converter of claim 3, wherein the balancing controller: i) obtains difference values between the balance current command and the phase current values of the other sub-circuits, ii) obtains a duty ratio correction value by amplifying each difference value at a predetermined amplification rate $K_p$, and iii) multiplies the duty ratio of the control signal output from the current controller by a value obtained by subtracting the duty ratio correction value from 1, thereby applying the obtained control signal as a control signal to the other sub-circuits of the other phases.

8. The multi-phase interleaved converter of claim 3, wherein the balancing controller: i) obtains difference values between the balance current command and the phase current values of the other sub-circuits, ii) amplifies each difference value at a predetermined amplification rate $K_p$, iii) obtains a duty ratio correction value by adding the value obtained by amplifying each difference value at another predetermined amplification rate $K_i$ and integrating the amplified difference value to the value amplified at the predetermined amplification rate $K_p$, and iv) multiplies the duty ratio of the control signal output from the current controller by a value obtained by subtracting the duty ratio correction value from 1, thereby applying the obtained control signal as a control signal to the sub-circuits of the other phases.

9. The multi-phase interleaved converter of claim 3, wherein the phase current value of the particular sub-circuit is used as the balance current command value.

10. The multi-phase interleaved converter of claim 3, wherein the balancing controller includes a balance current command generation block for outputting the balance current command value operated through a predetermined operation process using, as an input, multi-phase current information indicating the particular sub-circuit.

11. The multi-phase interleaved converter of claim 1, further comprising a filter for each phase, configured to: i) receive phase currents of each of the n sub-circuits, ii) compute an average of the received phase currents, and iii) output the received phase currents,
   wherein the phase current of each sub-circuit, averaged by the filter, is input to the balancing controller to adjust the duty ratio of the control signal.

12. A method for controlling a multi-phase interleaved converter, the method comprising:
   sensing phase current values of n sub-circuits of the multi-phase interleaved converter;
   receiving, by a current controller, a current control command and a phase current value of a particular sub-circuit of a particular phase among the n sub-circuits of respective phases;
   outputting, by the current controller, a control signal for controlling the particular sub-circuit of the particular phase;

receiving, by a balancing controller, phase current values of the n sub-circuits of the respective phases and the control signal output from the current controller;

adjusting, by the balancing controller, duty ratios of control signals applied to other sub-circuits based on the received phase current values of the n sub-circuits of the respective phases and the received control signal of the current controller, and shifting, by a phase shifter, the phase of a control signal output from the balancing controller, wherein an output of each sub-circuit is controlled based on the control signal output from the current controller and the control signal of which phase is shifted by the phase shifter.

13. The method of claim 12, further comprising:

receiving, by a voltage controller, output voltages of the n sub-circuits; and outputting, by the voltage controller, the current control command according to an amplitude of the received output voltages.

14. The method of claim 12, further comprising:

calculating, by the balancing controller, difference values between a balance current command value determined from the phase current value of the particular sub-circuit and phase current values of the other sub-circuits; and adjusting, by the balancing controller, the duty ratios of control signals applied to the other sub-circuits based on the difference values and the control signal of the current controller.

15. The method of claim 12, further comprising:

decreasing, by the balancing controller, the duty ratio of a control signal applied to a sub-circuit of any one phase among the n sub-circuits, when phase current of the sub-circuit of the one phase is greater than that of a sub-circuit of another phase.

16. The method of claim 12, further comprising:

increasing, by the balancing controller, the duty ratio of a control signal applied to a sub-circuit of any one phase among the n sub-circuits, when phase current of the sub-circuit of the one phase is smaller than that of a sub-circuit of another phase.

17. The method of claim 12, wherein the phase shifter phase-shifts, by 360/n×(n−1) degrees, the control signal output from the balancing controller in an n-phase interleaved converter.

18. The method of claim 14, further comprising:

obtaining, by the balancing controller, difference values between the balance current command and the phase current values of the other sub-circuits;

obtaining, by the balancing controller, a duty ratio correction value by amplifying each difference value at a predetermined amplification rate $K_p$; and multiplying, by the balancing controller, the duty ratio of the control signal output from the current controller by a value obtained by subtracting the duty ratio correction value from 1, thereby applying the obtained control signal as a control signal to the other sub-circuits of the other phases.

19. The method of claim 14, further comprising:

obtaining, by the balancing controller, difference values between the balance current command and the phase current values of the other sub-circuits;

amplifying, by the balancing controller, each difference value at a predetermined amplification rate $K_p$;

obtaining, by the balancing controller, a duty ratio correction value by adding the value obtained by amplifying each difference value at another predetermined amplification rate $K_i$ and integrating the amplified difference value to the value amplified at the predetermined amplification rate $K_p$; and multiplying, by the balancing controller, the duty ratio of the control signal output from the current controller by a value obtained by subtracting the duty ratio correction value from 1, thereby applying the obtained control signal as a control signal to the other sub-circuits of the other phases.

20. The method of claim 12, wherein the phase current value of the particular sub-circuit is used as the balance current command value.

21. The method of claim 14, wherein the balancing controller uses a balance current command operated through a predetermined operation process using, as an input, multiphase current information indicating the particular sub-circuit.

22. The method of claim 12, further comprising:

receiving, by a filter, phase currents of each of the n sub-circuits;

computing, by the filter, an average of the received phase currents; and outputting, by the filter, the received phase currents, wherein the phase current of each sub-circuit, averaged by the filter, is input to the balancing controller to adjust the duty ratio of the control signal.

* * * * *